Jan. 15, 1963   J. REIERSEN   3,073,608
FLUID SEALS
Filed June 6, 1960
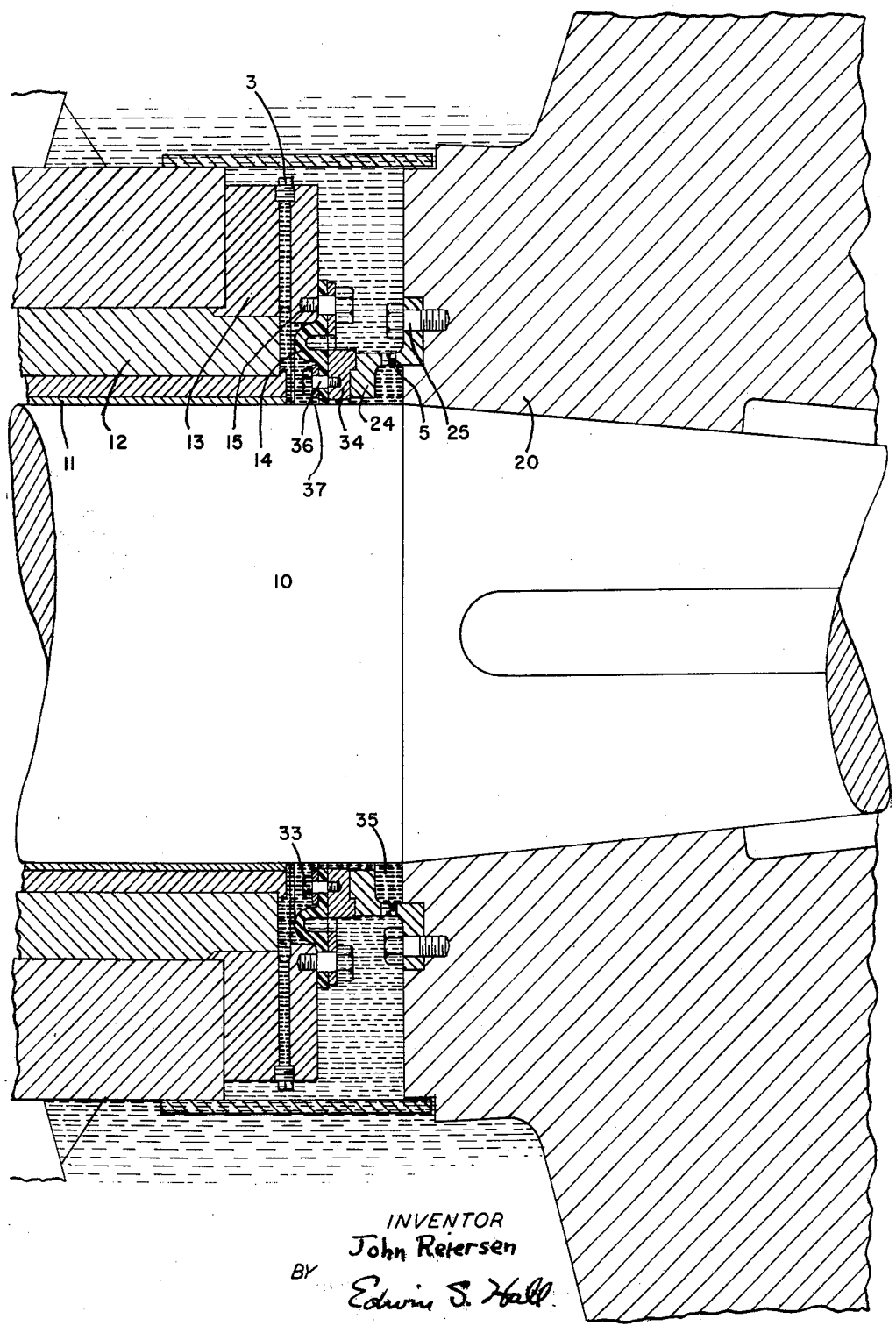
INVENTOR
John Reiersen
BY Edwin S. Hall
ATTORNEY

3,073,608
FLUID SEALS
John Reiersen, 1036 79th St., Brooklyn 28, N.Y.
Filed June 6, 1960, Ser. No. 34,061
1 Claim. (Cl. 277—27)

This invention relates to fluid seals applicable especially to outboard bearings of marine propeller shafts.

An object of the invention is to provide a fluid seal structure of few and simple parts which will insure oil lubrication of the propeller shaft bearing and prevent water from coming into contact with the propeller shaft. In other words, an object of the invention is to provide a complete closure about the outboard end of the propeller shaft, a closure which will effectively maintain the shaft in an oil bath sealed from corrosion by the water in which the propeller operates.

Another object of the invention is to provide means for actuating the fluid seal, said means comprising a structure which will maintain suitable differential fluid pressures, a structure such that the product of seal ring area exposed to oil and the oil pressure acting thereon will be always greater than the product of seal ring area exposed to water and the water pressure acting thereon.

In a ship the stern bearing is bored somewhat larger than the diameter of the propeller shaft, to facilitate passing the shaft endways through the lengthy stern tube, and to provide running clearance. Expansion and contraction of the hull and shaft, due to temperature changes and working stresses, cause appreciable longitudinal movements of the propeller and shaft relative to the outboard bearing. An object of this invention is to provide a fluid seal structure which will accommodate considerable lateral and longitudinal movement of the propeller and shaft relative to the outboard bearing while maintaining the desired sealing contact between the sealing rings.

These and other objects of the invention will be readily understood from the following description in connection with the drawing in which is shown a longitudinal section of the invention.

Referring to the drawing, propeller shaft 10 is operable in outboard bearing 11 mounted in the outer end of housing tube 12. Flange 13 is secured to the end of tube 12. Resilient ring 14 is secured to flange 13 by screws 15. Resilient disc 14 is made of suitable flexible material such as synthetic rubber. Seal ring 34 is clamped to resilient ring 14 by screws 36 and plate 37.

Propeller hub 20 may be keyed onto the tapered end of shaft 10 and locked by a dome-nut in a well-known manner, the dome-nut preventing water from reaching the end of the shaft. Shaft seal ring 24 is secured to hub 20 by screws 25 and is provided with a bearing face operably conforming to the bearing face of seal ring 34. The bearing faces may be spherical, flat, or stepped as shown.

The resilient material of disc 14 is formed as an annular bellows loop permitting the inner portion, carrying seal ring 34, to move laterally and longitudinally relative to the outer portion while maintaining operable sealing contact with seal ring 24.

Before the ship is launched, lubricating oil may flow into annular spaces 33 and 35 when vent plugs 3 and 5 are removed. As soon as the air is vented, plugs 3 and 5 may be replaced. The spaces 33 and 35 remain filled with oil. Shaft 10 will run with flooded lubrication in bearing 11. The supply tank from which oil flows to the bearing may be sufficiently high relative to the water line to maintain suitable oil pressure on the inboard face of resilient ring 14 higher than the water pressure on its outer face. The annular area of resilient ring 14 exposed to oil pressure is greater than its annular area exposed to water pressure. Moreover pump means may be used if desired to maintain the desired differential fluid pressure to insure no leakage of water between the coacting bearing faces of seal rings 24 and 34. The seal will always prevent water from reaching the shaft.

Having thus described the invention, it is clear that its objects as stated have been attained in a simple and practical manner. While a single embodiment of the invention has been shown and described, it is understood that changes may be made in the structure and in the arrangement of the various parts of the invention without departing from its spirit or scope as defined in the following claim.

I claim:

A seal between an outboard bearing structure and a marine propeller shaft, said seal comprising a metallic ring attached to and rotating with said propeller, a bellows ring means of resilient material attached to said bearing structure, and a metallic seal ring attached to said bellows ring means and forming therewith a wall separating sea water from lubricating oil, the wall area exposed to oil being considerably larger than the wall area exposed to water, said metallic seal ring being pressed against the aforesaid metallic ring by the resilience of said bellows ring means and by differential fluid pressures, the product of the oil pressure and the larger wall area being always higher than the product of the varying water pressure and the smaller area.

References Cited in the file of this patent

UNITED STATES PATENTS 2,127,151    Aldinger _____ Aug. 16, 1938
2,743,121    Stevens _____ Apr. 24, 1956